United States Patent [19]
Karthikeyan et al.

[11] Patent Number: 6,167,365
[45] Date of Patent: Dec. 26, 2000

[54] METHOD OF INITIALIZING CPU FOR EMULATION

[75] Inventors: Madathil R. Karthikeyan; Natarajan Venkatesh, both of Bangalore, India

[73] Assignee: Texas Instruments Incorporated, Dallas, Tex.

[21] Appl. No.: 09/154,385

[22] Filed: Sep. 16, 1998

Related U.S. Application Data

[60] Provisional application No. 60/078,813, Mar. 20, 1998.

[30] Foreign Application Priority Data

Feb. 6, 1998 [IN] India ......................................... 241/98

[51] Int. Cl.$^7$ ................................................... G06F 9/455
[52] U.S. Cl. ................................... 703/28; 703/26; 713/2; 702/119
[58] Field of Search .................... 395/500.44, 500.45, 395/500.49, 651, 652; 702/119; 717/4; 703/23, 26, 28; 713/1, 2

[56] References Cited

U.S. PATENT DOCUMENTS

| | | | |
|---|---|---|---|
| 5,630,102 | 5/1997 | Johnson et al. | 703/28 |
| 5,687,371 | 11/1997 | Lee et al. | 703/28 |
| 5,860,125 | 1/1999 | Reents | 713/320 |
| 5,861,248 | 1/1999 | Typaldos et al. | 714/724 |
| 5,872,954 | 2/1999 | Matsushita | 703/23 |
| 5,898,862 | 4/1999 | Vajapey | 703/28 |
| 6,009,256 | 12/1999 | Tseng et al. | 703/23 |

FOREIGN PATENT DOCUMENTS

| | | |
|---|---|---|
| 0 762 277 A1 | 3/1997 | European Pat. Off. . |
| 0 652 516 A1 | 5/1997 | European Pat. Off. . |

OTHER PUBLICATIONS

Motorola DSP56100 Technical Data. DSP56100 Technical Data, Section 10, On–Chip Emulation (OnCE) [online], Motorola Corp., Oct. 7, 1996 [retrieved on Jul. 8, 1999]. Retrieved from the Internet at http://www.mot.com/pub/SPS/DSP/LIBRARY/56100/FM_REV0/10.PD.

Motorola DSP ADS User's Manual, Digital Signal Processor (DSP) Application Development System (ADS) User's Manual, Sections 1–5 [online], Motorola Corp., Aug. 13, 1997 [retrieved on Aug. 9, 1999]. Retrieved from the Internet at http://www.mot.com/pub.

Gonzalez, D. R., "Tool Reusable for DSP System Emulation and Board Production Testing", Norhtcon/96, pp. 306–311, Nov. 1996.

Chen et al., "A Real–Time TMS 320C40 Based Parallel System for High Rate Digital Signal Processing", 1991 Intern. Conference on Acoustics, Speech and Signal Processing, pp. 1573–1576, vol. 3, Apr. 1991.

Winters, M., "Using IEEE–1149.1 for In–Circuit Emulation", Conference Record WESCON/94, pp. 525–528, Sep. 1994.

Bannatyne, R. "Debuggin Aids for System–on–a–Chip", Proceedings Northcon/98, pp. 158–163, Oct. 1998.

*Primary Examiner*—Kevin J. Teska
*Assistant Examiner*—Douglas W. Sergent
*Attorney, Agent, or Firm*—Bret J. Petersen; Frederick J. Telecky, Jr.

[57] ABSTRACT

A method of initializing a CPU (14) to run emulation code from a debugger (11). Emulation logic (13) associated with the CPU (14) has a finite state machine (13b) with three modes: a reset mode in which no requests from said debugger or said CPU are serviced, a normal mode in which requests from said debugger are given priority, and a start-up mode in which only requests from said debugger are serviced. For initialization, the finite state machine (13b) is placed in reset mode and held in reset while the start-up mode is requested. When the reset mode is released the start-up mode is immediately serviced. This permits an initialization state to be cleanly applied to the CPU (14).

15 Claims, 1 Drawing Sheet

METHOD OF INITIALIZING CPU FOR EMULATION

This application claims priority under 35 USC § 119(e)(1) of provisional application No. 60/078,813 filed Mar. 20, 1998.

TECHNICAL FIELD OF THE INVENTION

This invention relates to digital processors, and more particularly to development tools for such processors.

BACKGROUND OF THE INVENTION

Microprocessors have found their way into a huge variety of products. Often the processor and its programming is completely "embedded" into the design of the device, hence the term "embedded processors" to describe such processors. Several examples of devices having embedded processors are cellular telephones, computer printers, high performance disk drives for computer data, and automobile control systems.

Development tools that are useful for general purpose (non-embedded) processors are not satisfactory for embedded processor development. In other words, the test procedures for production of the processor itself may not be satisfactory for testing the processor in its embedded environment. It is more difficult to have visibility into processor operation. To solve this problem, one technique that is being increasingly used is referred to as "emulation".

In general, an emulator, whether software or hardware, permits direct control by a designer over a target processor. Because it is the application in which the processor will be used, and not the processor itself, that is being designed, the emulator must emulate those conditions.

In-circuit emulation, commonly referred to as ICE, uses emulators that are typically a combination of hardware and software. The emulator is typically connected between the embedded processor and a host CPU that is running debugging software. The emulation is "in-circuit" in the sense that the processor may be connected to the emulator while it is embedded into the system in which it is to be embedded.

Real-time in-circuit emulation permits a software designer to monitor, analyze, and modify code without impacting operation of the device in which the processor is embedded. The behavior of the emulator is identical to that of the target. For example, in the case of an embedded processor for a disk drive, the emulator might permit the designer to modify the code while the disk drive continues to run normally.

SUMMARY OF THE INVENTION

One aspect of the invention is a method of initializing a processor to run emulation code provided by a debugger. The CPU is provided with emulation logic for controlling an initialization sequence, said emulation logic being in communication with both the CPU and the debugger. The emulation logic is placed in a reset mode, such that no requests from said CPU or from said debugger are serviced. Next, the emulation logic is requested to enter a start-up mode, in which-only requests from the debugger are serviced. The emulation logic is then released from the reset mode, such that it immediately enters the start-up mode. During this start-up mode, the CPU is placed in a desired initialization state. Finally, the emulation logic is released from the start-up mode, such that the emulation code may now be executed.

An advantage of the invention is that it accomplishes emulation initialization without the need for scanning in a start-up state. The result is a faster and less complicated initialization than a scan type initialization. The method may be used when no system clocks are available.

DETAILED DESCRIPTION OF THE INVENTION

Overview of Emulation System

Figure 1:
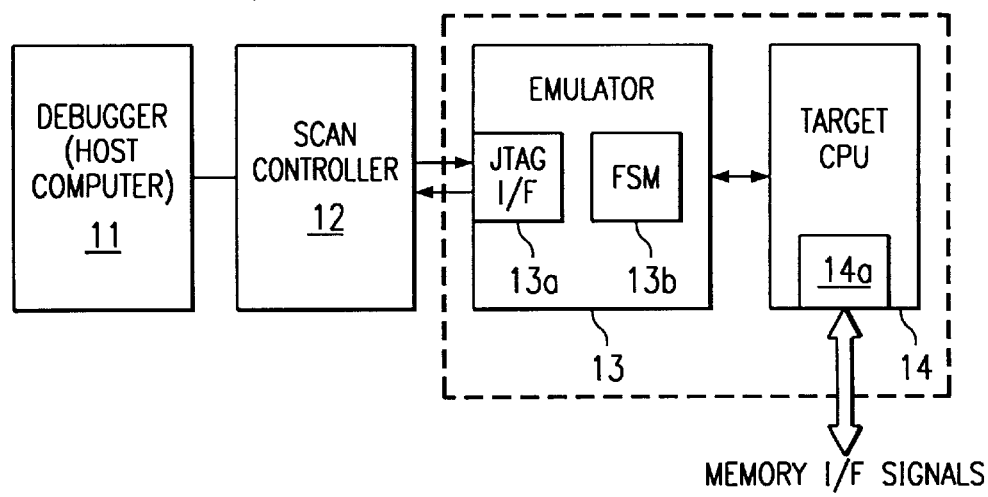
FIG. 1 is a block diagram of an emulation system having emulation logic in accordance with the invention, and a CPU under development using the emulation system.

FIG. 1 is a block diagram of an emulation system 10 for an embedded CPU 14. Emulation system 10 is comprised of debug software executable on a host computer (debugger 11), a scan controller 12, and emulation logic (emulator 13).

Emulation system 10 is an in-circuit emulation system, that is, it is used for developing a particular application in which CPU 14 is to be used. For example, an applications developer might be designing an application such as a new cellular phone whose functions will be controlled by the processor 14. The programming under development is referred to herein as the "target" application code. Although not shown in FIG. 1, CPU 14 may have various connections to other parts of the application system in which it is to be embedded.

Execution of the programming being tested is under the control of debugger 11. More specifically, debugger 11 receives the output from an emulation process and transfers this output to emulator 13. It is through the user interface of debugger 11 that the developer interacts with emulator 13 to control and monitor the operation of CPU 14 as it executes the target application code.

Many variety of debugger software exist, but in general the debugger 11 provides at least an interface for the designer to input commands. Typically, the debugger 11 also provides displays of program execution, including values of variables, arrays, structures, pointers, and registers. Memory contents can typically be displayed and edited. Using a debugger 11, the contents of a register or other memory can be changed and the program restarted with new data. The debugger 11 may permit instructions to be executed one at a time or to be stopped at a specified instruction.

The commands issued by the debugger 11 are translated into serial bit patterns by scan controller 12. Scan controller 12 then provides these bit patterns to emulator 13 through a JTAG interface 13a associated with emulator 13. Results of commands and other messages from CPU 14 are sent back to debugger 11 through the same JTAG interface 13a and through scan controller 12. Scan controller 12 may be any one of a number of commercially available devices that convert computer-formatted data to a serial bit stream and vice versa.

JTAG interface 13a may also be referred to an IEEE 1149.1 interface, which identifies the IEEE standard with which it substantially complies. As is standard, JTAG interface 13a has at least five pins: test data input (TDI), test data output (TDO), test mode select (TMS), test clock (TCK), and test reset (TRST).

Emulator 13 provides various emulation functions. In the example of this description, it provides two modes of operation. In its real-time mode, if a break event occurs, the main body of the program code halts execution but time-critical interrupts can still be serviced. In its "stop" mode, all interrupts are disabled.

Emulator 13 is a DMA (direct memory access) emulator. In other words, it uses DMA accesses directly to the registers and other memory of CPU 14. This permits the debugger on host 11 to gain direct access to the contents of the memory. To this end, the emulator 13 takes control of the memory interface during unused cycles of the instruction pipeline. Thus, the CPU's memory may be monitored without requiring processor resources. It is an alternative to a "scan-based" emulator, which use an extension of the JTAG boundary scan standard to scan storage elements in the CPU.

In the example of this description, the DMA logic associated with emulator 13 detects unused bus cycles to gain access to memory. The emulator 13 can thus read and write to memory of CPU 14 and monitor CPU 14 without affecting the operation of the target application code.

The DMA function of emulator 13, as well as its other functions, may be implemented with logic circuitry. One or more state machines may be used to implement the various functions of emulator 13. As explained below in connection with FIG. 2, emulator 13 has a finite state machine (FSM) 13b, which handles initialization of emulation code.

CPU 14 has conventional processing elements. It has a memory interface for transferring data and control signals between CPU 14 and associated memory. It has connections for other signals, such as for clock and control signals, and reset and interrupt signals, as well as for signals to and from emulator 13.

As indicated in FIG. 1, emulator 13 and CPU 14 may be integrated on the same integrated circuit device. An example of such a device is one made from the T320C2700, a digital processor core available from Texas Instruments Incorporated. However, the same concepts can be extended to CPU's whose emulation logic is not integrated on-chip, in which case, emulator 13 could be implemented with additional software or with off-chip hardware. Typically, however, for initialization in accordance with the invention, the required processing speeds call for a least an on-chip finite state machine 13b.

Finite State Machine

Figure 2:
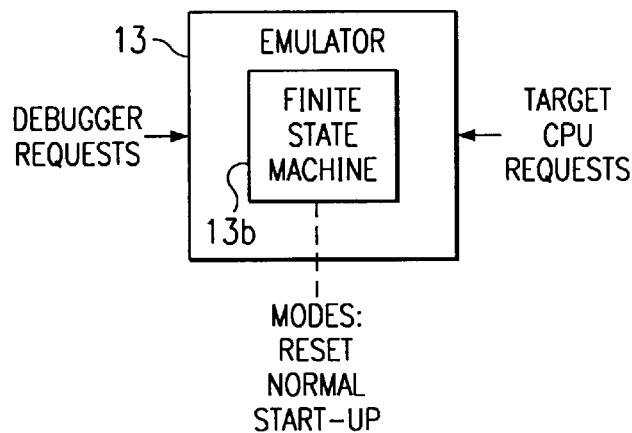
FIG. 2 illustrates the finite state machine of FIG. 1.

FIG. 2 illustrates state machine 13b, which services the bi-directional flow of control messages and data between debugger 11 and CPU 14. State machine 13b may also handle addition functions, such as providing an interface between scan controller 12 and CPU 14 for emulation code, also referred to as "monitor" code, defined as specially privileged code running on CPU 14 that performs debug functions.

As illustrated, state machine 13b has three modes: a reset mode, normal mode, and hermit (start-up) mode. In reset mode, no requests are serviced. In normal mode, debugger and CPU requests are serviced, with priority to debugger requests. In start-up mode, only debugger requests are serviced; all access by CPU 14 to internal control paths is disabled.

FSM 13b may be implemented with known programmable logic circuitry. For example, an ASIC standard cell array or a PLD (programmable logic device) may be used. Like all state machines, FSM 13b directs a set of operations (described below) so that they occur in desired sequences, synchronized by a clock signal.

CPU Initialization with Emulation Logic

Figure 3:
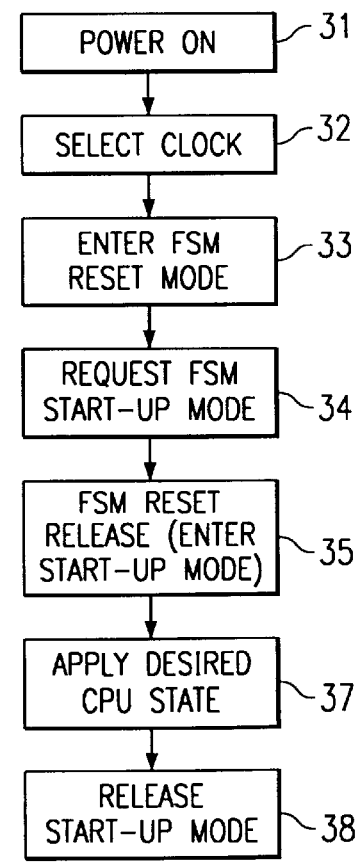
FIG. 3 illustrates the initialization method of the invention.

FIG. 3 illustrates a method of initializing CPU 14 to run emulation code in accordance with the invention. As explained below, this method provides an initial emulation logic state regardless of the CPU state.

The various requests for service described below may be accomplished with JTAG sequences via debugger 11. Each sequence is scanned in, using the JTAG TDI and TMS signals, by means of scan controller 12.

Step 31 is a power on step, which may result in CPU 14 coming up in a random state. This random state could prevent a "clean" initialization for the emulation logic. For example, clocks could be unknown and FSM 13b could be locked up.

In Step 32, clock select circuitry is switched to run emulator 13 and CPU 14 off the JTAG test clock (TCK). This ensures that all logic is clocked. Step 32 can be omitted if emulator and CPU clocks are running.

In Step 33, FSM 13b is put in reset mode. As explained above in connection with FIG. 2, all requests for service are ignored.

In Step 34, debugger 11 requests the start-up mode for FSM 13b. Thus, a debugger request is now active, although FSM 13b is still in reset mode. This request is not immediately serviced, but is held. For example, it may be held in a register associated with FSM 13b.

In Step 35, FSM 13b is released from the reset mode, again using a JTAG sequence. FSM 13b is now in normal mode, which requires FSM 13b to give priority to debugger requests. Thus, FSM 13b now services the request to enter the start-up mode. That is, in the first cycle after release from reset, FSM 13b reads the higher priority request to enter the start-up mode. Thus, regardless of the state of CPU 14, the start-up mode of FSM 13b is entered.

As a result of Step 35, the start-up mode is now on, such that FSM 13b ignores requests from CPU 14 and is free from CPU interference. Thus, CPU 14 may now be set to a known state.

Thus, in Step 37, the known CPU state is applied. In the example of this description, a reset state has previously been loaded to a register, but in general, the release accomplished by Step 39 permits any known state (whether previously requested or now requested) to be applied. Also, in the example of this description, there are various debug units between emulator 13 and CPU 14, which are initialized at this time by being held in reset.

In Step 38, the start-up mode is exited, such that FSM 13b in again in normal mode. CPU 14 has undergone a clean initialization and the emulation code may begin to execute.

Although the above description is in terms of emulation initialization, the same method can be used for error-recovery during emulation, such as when CPU 14 makes unwanted accesses to emulator resources. The two-way emulation link can be broken and CPU 14 prevented from accessing CPU logic.

Other Embodiments

Although the present invention has been described in detail, it should be understood that various changes, substitutions, and alterations can be made hereto without departing from the spirit and scope of the invention as defined by the appended claims.

What is claimed is:

1. A method of initializing a central processing unit (CPU) to run emulation code provided by a debugger, comprising the steps of:

providing the central processing unit (CPU) in an unknown state;

providing emulation logic for controlling an initialization sequence, said emulation logic being in communication with said CPU and said debugger;

placing said emulation logic in a reset mode, such that no requests from said CPU or from said debugger are serviced;

requesting said emulation logic to enter a start-up mode, in which only requests from said debugger are serviced;

releasing said emulation logic from said reset mode, such that said emulation logic enters said start-up mode;

placing said CPU in a desired initialization state; and releasing said emulation logic from said start-up mode, such that said emulation code may be executed.

2. The method of claim 1, wherein said emulation logic is implemented as a finite state machine.

3. The method of claim 1, wherein said requesting and releasing steps are performed via a JTAG sequence input to said emulation logic.

4. The method of claim 1, wherein said desired initialization state is a continuous reset state.

5. The method of claim 1, wherein said placing step is the result of requesting and applying steps separated in time by said releasing step.

6. The method of claim 1, wherein said requesting step is performed by a request to enter said start-up mode in a register accessed by said state machine.

7. The method of claim 1, wherein said releasing step is accomplished such that said emulation logic immediately enters a normal mode in which requests from said debugger are given priority and such that said emulation logic enters said start-up mode.

8. The method of claim 1, further comprising the step of setting said emulation logic and said CPU on a common clock.

9. The method of claim 8, wherein said common clock is a JTAG clock.

10. The method of claim 1, wherein said step of releasing said emulation logic from said start-up mode, results in said emulation logic entering a normal mode in which requests from both said CPU and said debugger are serviced.

11. An on-chip emulation logic circuit for an embedded CPU and for initializing said CPU for emulation code provided by a debugger, comprising:

JTAG interface for bi-directional communications between said CPU and said debugger;

a finite state machine for initializing said CPU while in an undefined state to run emulation code, said finite state machine operable to enter any one of the following three modes: a reset mode in which no requests from said debugger or said CPU are serviced, a normal mode in which requests from said debugger are given priority, and a start-up mode in which only requests from said debugger are serviced;

means for holding a request for said start-up mode while said finite state machine is in said reset mode; and emulation logic for performing one or more emulation functions during execution of said emulation code.

12. The emulation logic circuit of claim 11, wherein said means for holding is a register.

13. A processor device for use with a debugger, comprising:

a central processing unit (CPU); and emulation logic integrated onto said device, said emulation logic comprising at least a finite state machine for initializing said central processing unit while in an undefined state to run emulation code, said finite state machine operable to enter any one of the following three states: a reset state in which no requests from said debugger or said CPU are serviced, a normal state in which requests from said debugger are given priority, and a start-up state in which only requests from said debugger are serviced; and a data interface for providing data to said device from said debugger.

14. The device of claim 13, wherein said data interface is a serial data interface.

15. The device of claim 13, wherein said data interface is a JTAG interface.

* * * * *